Patented June 2, 1953

2,640,853

UNITED STATES PATENT OFFICE 2,640,853

PRODUCTION OF ORGANIC SULFONYL HYDRAZIDES

Norman K. Sundholm, Naugatuck, Conn., assignor to United States Rubber Company, New York, N. Y., a corporation of New Jersey No Drawing. Application July 10, 1951, Serial No. 236,093

3 Claims. (Cl. 260—556)

This invention relates to improvements in the production of organic sulfonyl hydrazides.

It is customary in this art to react a selected organic sulfonyl chloride with an excess of hydrazine to form the desired sulfonyl hydrazide along with hydrazine hydrochloride. In such a reaction the excess of hydrazine acts as a hydrochloric acid-binding agent. This reaction is relatively expensive because of the relatively high cost of hydrazine, which tends to prohibit its use as an acid-binding agent in commercial practice.

Alkalies ordinarily have a tendency to react with organic sulfonyl chlorides; inorganic bases such as caustic soda tend to form compounds of the type $RSO_3Na$, and ammonia tends to form sulfonamides of the type $RSO_2NH_2$. It has now been unexpectedly discovered, as concerns the present reaction, that in spite of the presence of ammonia, that the sulfonyl chloride reacts preferentially with the hydrazine in an aqueous mixture of the hydrazine and ammonia. Further, it has been found that the ammonia does not interfere, to any appreciable extent, with regard to the yield and quality of the desired sulfonyl hydrazide, and at the same time it neutralizes the hydrochloric acid which is formed by the reaction between the hydrazine and the organic sulfonyl chloride.

The present reaction can be described by the equation

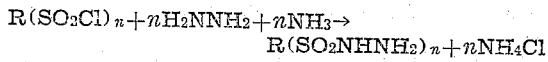

in which R is an organic radical, and n is the integer one or two.

Examples of sulfonyl chlorides which undergo the reaction are:

Benzenesulfonyl chloride
p-Toluenesulfonyl chloride
o-Chlorobenzenesulfonyl chloride
m-Nitrobenzenesulfonyl chloride
p-Methoxybenzenesulfonyl chloride
2-naphthalenesulfonyl chloride
1,3-benzenedisulfonyl chloride
1,5-naphthalenedisulfonyl chloride
4,4'-biphenyldisulfonyl chloride
4,4'-oxybis-(benzenesulfonyl chloride)
4,4'-thiobis-(benzenesulfonyl chloride)
2,8-dibenzofurandisulfonyl chloride
1-butanesulfonyl chloride
Cyclohexanesulfonyl chloride
1,4-butanedisulfonyl chloride
2,2'-oxybis-(ethanesulfonyl chloride).

Generally, but without limitation, these aforesaid sulfonyl chlorides embrace chemicals having a sulfonyl radical attached to hydrocarbon radicals and hydrocarbon radicals further substituted by halogen, nitro, alkoxy, and aryloxy groups. Any organic sulfonyl chloride which would give the hydrazide on treatment with excess hydrazine can be used.

The reaction can be carried out in two ways. In one, the mixture of hydrazine and ammonia is added slowly to a suspension of the sulfonyl chloride in water followed by a period of stirring during which the reaction is completed. In the other, the hydrazine is added first to the sulfonyl chloride suspension followed by a stirring period during which the reaction proceeds to a point described by the equation

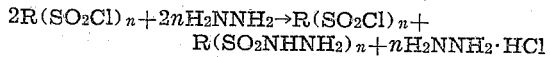

The $R(SO_2Cl)_n$ appearing at the right of the arrow shows that only one-half of the $R(SO_2Cl)_n$ has reacted with the hydrazine prior to the addition of ammonia.

The ammonia, which is then added slowly, frees the hydrazine from its hydrochloride to react with the unreacted sulfonyl chloride present.

The reaction temperatures are preferably in the range of 20° C. to 60° C., although lower and higher temperatures may be used, as desired.

The following examples are intended to illustrate the invention, but not to limit it.

*Example 1.—p,p'-Oxybis-(benzenesulfonyl hydrazide)*

To a solution of 66.4 grams (0.41 mole) of dihydrazine sulfate and 32.8 grams (0.82 mole) of sodium hydroxide in 200 ml. of water is added 51 grams (0.84 mole) of 28% aqueous ammonia. The sodium hydroxide reacts with the dihydrazine sulfate to form sodium sulfate in solution and to form hydrazine for reaction with the sulfonyl chloride. The hydrazine and ammonia solution is added dropwise during two hours to a well-stirred suspension of 146.8 grams (0.40 mole) of p,p'-oxybis-(benzenesulfonyl chloride) in 400 ml. of water. The initial temperature is 20° C.; the reaction temperature is increased slowly to 40° C. during the first forty-five minutes by the application of heat. The mixture is kept at this temperature for the remainder of the addition period and for four and one-half hours following. The mixture is then cooled in an ice-bath and filtered. The solid product, washed with water and air-dried, weighs 133 grams (93% of theory). Analysis shows that it contains 87% p,p'-oxybis-(benzenesulfonyl hydrazide).

Example 2.—p,p'-Oxybis-(benzenesulfonyl hydrazide)

The same quantities of materials are used that are used in Example 1. The solution of dihydrazine sulfate and sodium hydroxide in 150 ml. of water is added to the suspension of the sulfonyl chloride during thirty minutes, the temperature rising from 24° C. to 37° C. during the addition. After this mixture is stirred for one hour at 40° C., the ammonia dissolved in 150 ml. of water is added during thirty minutes at the same temperature. The mixture is stirred for two more hours at 40° C., cooled in an ice-bath, and filtered. The product weighs 132 grams (92% of theory). Analysis shows that it contains 91% p,p'-oxybis-(benzenesulfonyl hydrazide).

Example 3.—2-naphthalenesulfonyl hydrazide

This procedure is similar to that of Example 2. The reaction time is five and one-half hours. From 22.6 grams (0.10 mole) of 2-naphthalenesulfonyl chloride 20.5 grams (92% of theory) of the hydrazide product is obtained. Analysis shows that it contains 90% 2-naphthalenesulfonyl hydrazide.

Example 4.—p-Toluenesulfonyl hydrazide

This procedure is similar to that of Example 2. The reaction time is five hours and the temperature 30° C. From 19.0 grams (0.10 mole) of p-toluenesulfonyl chloride 15.0 grams (81% of theory) of the hydrazide product is obtained. Analysis shows that it contains 96% p-toluenesulfonyl hydrazide.

Example 5.—m-Nitrobenesulfonyl hydrazide

This procedure is similar to that of Example 1. The reaction time is one hour and fifteen minutes and the temperature 30° C. From 22.2 grams (0.10 mole) of m-nitrobenzenesulfonyl chloride 19.5 grams (90% of theory) of the hydrazide product is obtained. Analysis shows that it contains 92% m-nitrobenzenesulfonyl hydrazide.

Example 6.—1,4-butanedisulfonyl hydrazide

This procedure is similar to that of Example 2. The reaction time is two hours and the temperature 30° C. From 11.4 grams (0.045 mole) of 1,4-butanedisulfonyl chloride 7.7 grams (70% of theory) of the hydrazide product is obtained. Analysis shows that it contains 85% 1,4-butanesulfonyl hydrazide.

Instead of using the dihydrazine sulfate, the salt of any inorganic non-oxidizing acid may be used in Example 1, such as the hydrochloride, the phosphate, the hydrobromide, etc.; in fact, any hydrazine salt which would generate hydrazine on treatment with aqueous caustic may be used.

Having thus described my invention, what I claim and desire to protect by Letters Patent is:

1. In a method of forming an organic sulfonyl hydrazide from hydrazine and an organic sulfonyl chloride whose sole reactive grouping is the sulfonyl chloride group, the improvement which consists in the step of carrying out the reaction in aqueous suspension in the presence of ammonia in amount sufficient to neutralize the hydrochloric acid which is formed during the reaction.

2. In a method of forming an organic sulfonyl hydrazide from hydrazine and an organic sulfonyl chloride whose sole reactive grouping is the sulfonyl chloride group, the improvement which consists in the steps of carrying out the reaction in aqueous suspension in the presence of ammonia in amount sufficient to neutralize the hydrochloric acid which is formed during the reaction, and subsequently recovering the desired hydrazide from the reaction mix.

3. A method of preparing p,p'-oxybis-(benzenesulfonyl hydrazide) which comprises reacting p,p'-oxybis-(benzenesulfonyl chloride) with hydrazine in the presence of ammonia in amount sufficient to neutralize the hydrochloric acid formed during the reaction, and subsequently recovering the said hydrazide from the reaction mix.

NORMAN K. SUNDHOLM.

References Cited in the file of this patent

UNITED STATES PATENTS

| Number | Name | Date |
|---|---|---|
| 1,433,925 | Bader | Oct. 31, 1922 |
| 2,413,224 | Fox | Dec. 24, 1946 |
| 2,513,826 | Sprung et al. | July 4, 1950 |
| 2,552,065 | Schoene | May 8, 1951 |

OTHER REFERENCES

Degerring: "An Outline of Organic Nitrogen Compounds," (1945), pp. 378 and 383.

Wieland: "Diehydrazine," (1913), pp. 180 and 181.

Roth: "J. Am. Chem. Soc.," vol. 67 (1945), p. 128.

Curtins: "J. Prokt, Chem.," vol. 112 (1926), p. 125.